United States Patent
Banks et al.

(10) Patent No.: US 8,312,470 B2
(45) Date of Patent: Nov. 13, 2012

(54) RECURSIVE LOCKING OF A THREAD-SHARED RESOURCE

(75) Inventors: Lisa D. Banks, Poughkeepsie, NY (US); Jason A. Keenaghan, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 12/644,684

(22) Filed: Dec. 22, 2009

(65) Prior Publication Data

US 2011/0154368 A1  Jun. 23, 2011

(51) Int. Cl.
*G06F 3/00* (2006.01)
(52) U.S. Cl. .................... 719/310; 719/313; 710/20
(58) Field of Classification Search ............ 719/310; 718/104
See application file for complete search history.

(56) References Cited

U.S. PATENT DOCUMENTS

| | | | |
|---|---|---|---|
| 5,341,491 A * | 8/1994 | Ramanujan | 711/152 |
| 6,237,043 B1 | 5/2001 | Brown et al. | |
| 6,314,563 B1 | 11/2001 | Agesen et al. | |
| 6,735,760 B1 | 5/2004 | Dice | |
| 6,738,974 B1 * | 5/2004 | Nageswaran et al. | 718/104 |
| 7,380,039 B2 * | 5/2008 | Miloushev et al. | 710/244 |

OTHER PUBLICATIONS

Christian Haack, Reasoning about Java's Reentrant Locks, 2008.*

* cited by examiner

*Primary Examiner* — Lechi Truong
(74) *Attorney, Agent, or Firm* — Cantor Colburn LLP; Steven Chiu

(57) ABSTRACT

A process thread locking operations includes defining a lock structure having data fields that include a process thread identifier and a shared object identifier that uniquely identifies a shared object subject to lock operations and using the lock structure to build a lock table. The lock table includes lock structures for each process thread in the process and is searchable in response to a request for a shared object from a calling thread. The method also includes determining a lock status of the shared object. The lock status indicates whether the shared object is currently locked by the calling process thread. In response to the lock status, the method includes obtaining a lock on the shared object when the request is for a lock, and releasing a lock on the shared object when the request is to unlock the shared object.

20 Claims, 7 Drawing Sheets

RECURSIVE LOCKING OF A THREAD-SHARED RESOURCE

BACKGROUND

This invention relates generally to concurrent programming, and more particularly to implementing process thread locking in a concurrent computing environment.

In a concurrent programming environment that utilizes multiple threads within a single process, there is a need to synchronize access among the threads to a shared object. To facilitate synchronization, one current solution uses a field called "lock word" that is stored in a header section of the shared object (e.g., the field indicating whether a lock has been acquired for the object). In this solution, a thread synchronizes access to the shared object by performing an atomic test-and-set operation on the lock word. A test-and-set operation refers to an instruction used by a thread to test and/or write to a memory location as part of a single atomic (non-interruptible) operation. However, in this solution, if the thread releases the storage used for the shared object, the lock may no longer be queried by other threads in the process and test-and-set operations may have unknown effects that could be potentially catastrophic for a system. Furthermore, the use of test-and-set operations prevents a thread from recursively locking the shared object. For example, depending on the implementation of the test-and-set operation, multiple attempts by a single thread to lock the same shared object may result in the thread blocking itself or a system error.

Another locking mechanism called a "mutex" is also used by threads to lock a shared object in order to facilitate recursive locking and, similar to the lock word, it is typically stored in the shared object itself in order to uniquely associate the mutex with the shared object. Similar to the test-and-set operation, the use of a mutex requires guaranteed access to the storage backing the shared object and its results can be hazardous to the system if the storage is not valid.

What is needed, therefore, is a way to provide recursive thread locking of shared objects that eliminates the potential for a thread blocking itself.

BRIEF SUMMARY

Exemplary embodiments include a method for implementing process thread locking operations. The method includes defining a lock structure having data fields that include a process thread identifier and a shared object identifier that uniquely identifies a shared object subject to lock operations. The method also includes using the lock structure to build a lock table. The lock table includes lock structures for each process thread in the process and is searchable in response to a request for a shared object from a calling thread. The method also includes determining a lock status of the shared object. The lock status indicates whether the shared object is currently locked by the calling process thread. In response to the lock status, the method includes obtaining a lock on the shared object when the request is for a lock, and releasing a lock on the shared object when the request is to unlock the shared object.

Exemplary embodiments further include a system for implementing process thread locking operations. The system includes a computer processor and system logic executing on the computer processor. The system logic implements a method. The method includes defining a lock structure having data fields that include a process thread identifier and a shared object identifier that uniquely identifies a shared object subject to lock operations. The method also includes using the lock structure to build a lock table. The lock table includes lock structures for each process thread in the process and is searchable in response to a request for a shared object from a calling thread. The method also includes determining a lock status of the shared object. The lock status indicates whether the shared object is currently locked by the calling process thread. In response to the lock status, the method includes obtaining a lock on the shared object when the request is for a lock, and releasing a lock on the shared object when the request is to unlock the shared object.

Exemplary embodiments further include a computer program product for implementing process thread locking operations. The computer program product includes a storage medium encoded with machine-readable computer program code, which when executed by a computer processor implement a method. The method includes defining a lock structure having data fields that include a process thread identifier and a shared object identifier that uniquely identifies a shared object subject to lock operations. The method also includes using the lock structure to build a lock table. The lock table includes lock structures for each process thread in the process and is searchable in response to a request for a shared object from a calling thread. The method also includes determining a lock status of the shared object. The lock status indicates whether the shared object is currently locked by the calling process thread. In response to the lock status, the method includes obtaining a lock on the shared object when the request is for a lock, and releasing a lock on the shared object when the request is to unlock the shared object.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Exemplary embodiments of the invention enable synchronized locking operations in a multi-threaded computer system environment. A locking structure is configured to enable recursion and provides separation of a lock word from a shared resource (also referred to herein as "shared object") that is subject to a lock. The locking structure also provides the ability for a thread to release the storage for a shared object without negatively impacting other threads that attempt to lock the same shared object. Additionally, the locking structure provides the ability for a single thread to gain and release the lock word for a shared object multiple times. This may be useful when a thread calls a series of functions that perform nested locking. The locking structure further enables separate processes to lock different objects that happen to map to the same virtual address within its respective process' storage area.

Exemplary embodiments of the invention may be implemented on a multithreading computer system that may include one or more processors coupled to a bus. Alternatively, the system may have a processor that is a multi-core processor, or in other instances, multiple multi-core processors. In exemplary embodiments in which the system includes multiple processors or a multi-core processor, processing is divided into multiple threads, each with its own hardware processor state, within a single-software defined process or within multiple processes. In exemplary embodiments, the system may include a processor that is hyper-threaded, or able to perform in a manner as if it were a multi-core processor despite having only a single core.

In exemplary embodiments, the multithreading computer system may include a shared transactional memory and support a set of transactional operations. Transactional processing, in which sequences of concurrent operations are combined into atomic transactions, is implemented to maintain the system in a consistent state by ensuring that any interdependent operations carried out on the system are either all completed successfully or canceled successfully. That is, each transaction must succeed or fail as a complete unit. Every thread completes its modifications to shared memory without regard to the activities of the other threads, and changes to shared memory for an entire transaction are validated and committed if other threads have not concurrently made changes.

Figure 1:
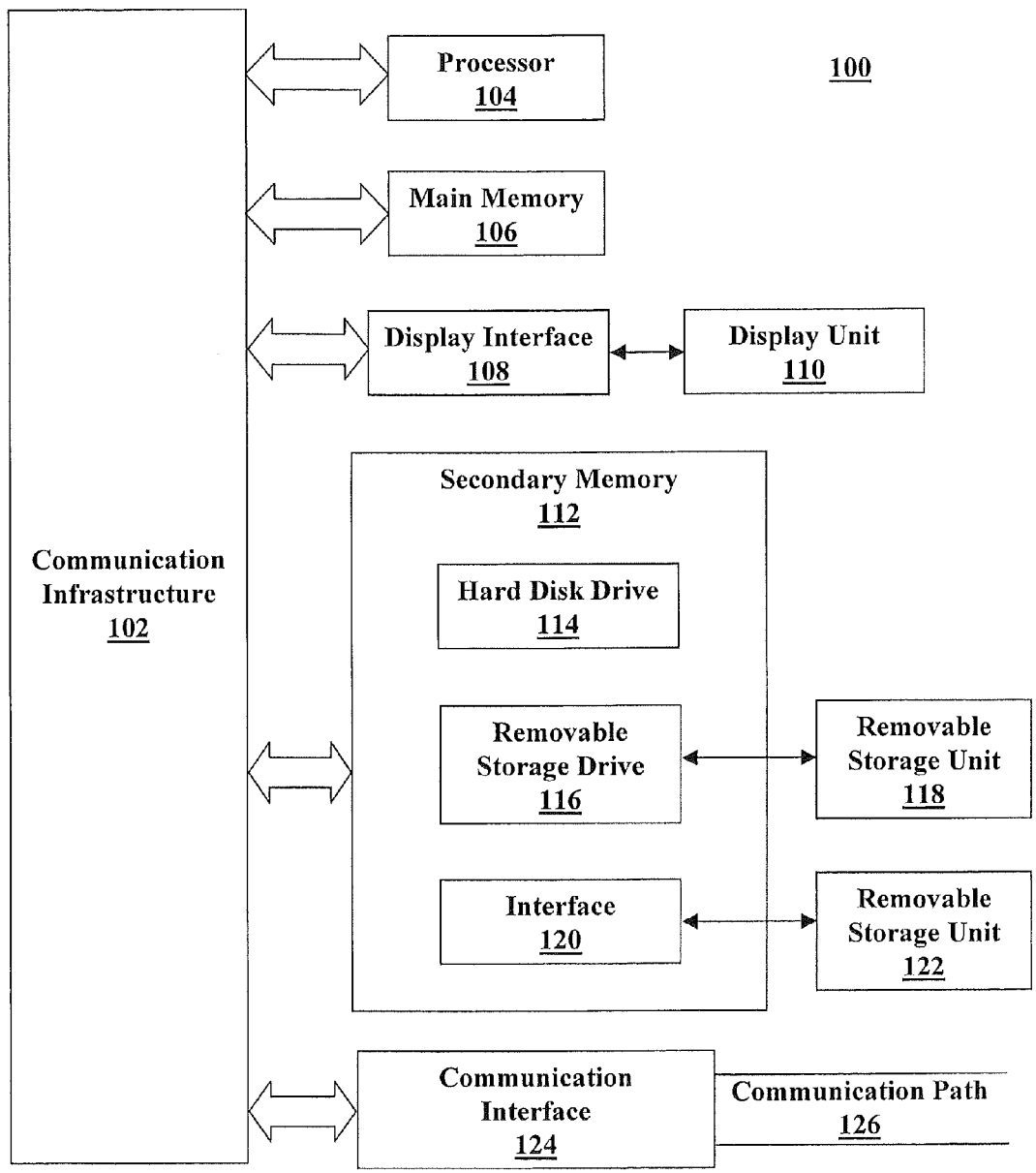
FIG. 1 is a block diagram depicting a system upon which recursive thread locking may be implemented in accordance with exemplary embodiments of the present invention.

Turning now to FIG. 1, an exemplary system 100 for implementing recursive thread locking operations will now be described. The system 100 of FIG. 1 may form part of a multithreaded computer system operating in a concurrent programming environment. The system 100 includes one or more processors, such as processor 104. Processor 104 may be connected to a communication infrastructure 102 (for example, a communications bus, cross-over bar, or network, to name a few). Various software embodiments are described in terms of this exemplary system. For example, the system 100 includes logic (also referred to as "system logic") that is executable by one or more processors for implementing the lock operations described herein.

The system 100 may include a display interface 108 that forwards graphics, text, and other data from the communication infrastructure 102 (or from a frame buffer, not shown) for display on a display unit 110. System 100 may also include a main memory 106, which may be random access memory (RAM), and may also include a secondary memory 112. Secondary memory 112 may include, for example, a hard disk drive 114 and/or a removable storage drive 116, representing a floppy disk drive, a magnetic tape drive, an optical disk drive, etc. Removable storage drive 116 reads from and/or writes to a removable storage unit 118 in a manner well known to those having ordinary skill in the art. Removable storage unit 118, represents, for example, a floppy disk, magnetic tape, optical disk, etc. which is read by and written to by removable storage drive 116. Removable storage unit 118 may include a computer usable storage medium having stored therein computer software and/or data.

Exemplary embodiments of system 100 may further include a transactional memory for sharing stored resources, or objects, and mediating shared resource accesses among different requesting threads or processes. Variations on the specific architectural components of system 100 may include the inclusion of the transactional memory as a component of a processor or processors (e.g., processor 104) of the system 100 in some instances; in an alternative, the transactional memory may be a separate component on a bus (e.g., communication infrastructure 102) connected to the processor or processors.

In exemplary embodiments, secondary memory 112 may include other similar means for allowing computer programs or other instructions to be loaded into the system 100. Such means may include, for example, a removable storage unit 122 and an interface 120. Examples of such may include a program cartridge and cartridge interface (such as that found in video game devices), a removable memory chip (such as an EPROM, or PROM) and associated socket, and other removable storage units 122 and interfaces 120 which allow software and data to be transferred from the removable storage unit 122 to system 100.

System 100 may also include a communication interface 124. Communication interface 124 allows software and data to be transferred between the system and external devices. Examples of a communication interface 124 may include a modem, a network interface (such as an Ethernet card), a communications port, a PCMCIA slot and card, etc. Software programs and data transferred via communication interface 124 are in the form of signals which may be, for example, electronic, electromagnetic, optical, or other signals capable of being received by communication interface 124. These signals may be provided to communication interface 124 via a communications path 126 (also referred to herein as "channel"). Channel 126 carries signals and may be implemented using wire or cable, fiber optics, a phone line, a cellular phone link, an RF link, and/or other communications channels.

In exemplary embodiments, the system 100 of FIG. 1 implements a locking structure for performing recursive thread locking operations. The locking structure may be implemented, e.g., as a database table and may be stored in memory of the system 100. For example, the locking structure table (also referred to herein as "lock table") may be stored in the transactional memory component of processor 104. Alternatively, the lock table may be stored in main memory 106, secondary memory 112, or may be accessible by the communications interface 124 from external devices via the communications path 126. A sample lock table 200 implemented using the exemplary locking structure is shown in FIG. 2.

In a concurrent programming environment, a set of processes may execute on one or more processors (e.g., processor 104). A process refers to a unit of concurrent programming (e.g., a program or section of a program). Multiple processes may be executing the same section of the program simultaneously and each process may, in turn, include multiple threads. A process thread refers to a sub-element of a process or a stream of instructions simultaneously executed within the same program. In concurrent programming, a multithreading processing technique may be employed that enables two or more of the same type of transaction to be carried out simultaneously. Each stream processes a different transaction message.

Figure 2:
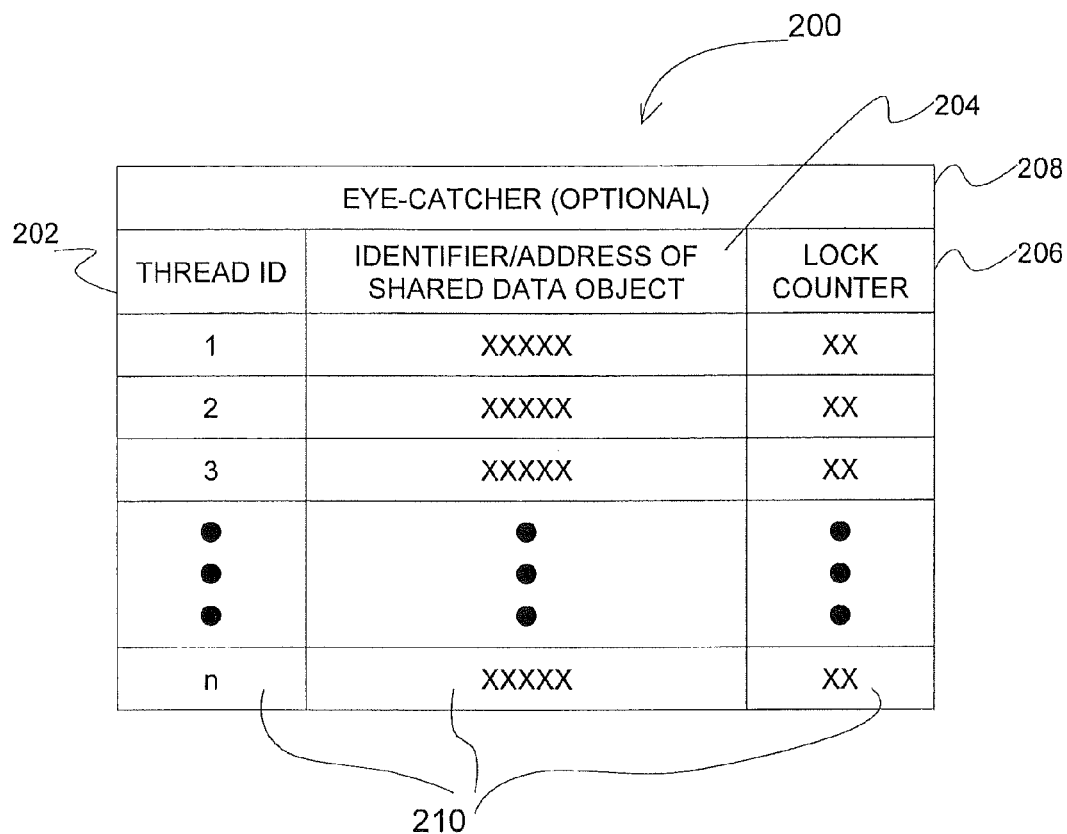
FIG. 2 is a table including a locking structure for use in implementing recursive thread locking operations in an exemplary embodiment.

Turning now to FIG. 2, a lock table 200 implemented using an exemplary lock structure will now be described. The table 200 may be implemented as an array of lock structures that is indexed based on a process thread's identification number, whereby the number of rows in the table 200 represents a maximum number of threads for a given process. The lock table 200 is subject to the exclusive use of the threads common to a particular process. It will be understood, however, that the system 100 may also employ a system lock table that controls access to system resources by multiple processes in the system. In the embodiment shown in FIG. 2, an exemplary lock structure 210 collectively comprises a row of the lock table 200 that includes data fields for a process thread identifier (field 202), an identifier for a shared object (field 204), and a lock counter (field 206). As shown in FIG. 2, a shared object identifier and lock counter are each associated with a corresponding process thread. The thread identifier field 202 stores a unique identification for each thread in a process. The identifier for the shared object 204 may be implemented as the storage address for the shared object. This identifier 204 represents a lock word for the lock structure. The shared object represents a system resource such as a block of memory for which access to threads in a process shared. The lock counter tracks a lock value for its corresponding thread identifier. In an exemplary embodiment, the lock counter is incremented and/or decremented in response to locking operations performed with respect to the shared object. Results of the incrementing and decrementing determine the lock value. In an exemplary embodiment, a lock status is determined in response to requests by process threads for a shared object by comparing the address of the shared object called by the thread with the address of the shared object (via the value in field 204). The lock status may include, e.g., a currently held lock on the shared object, the absence of a lock on the shared object, and a recursive lock held on the shared object. In one embodiment, the table 200 may include an eye-catcher field 208, which is described further herein.

Figure 3A:
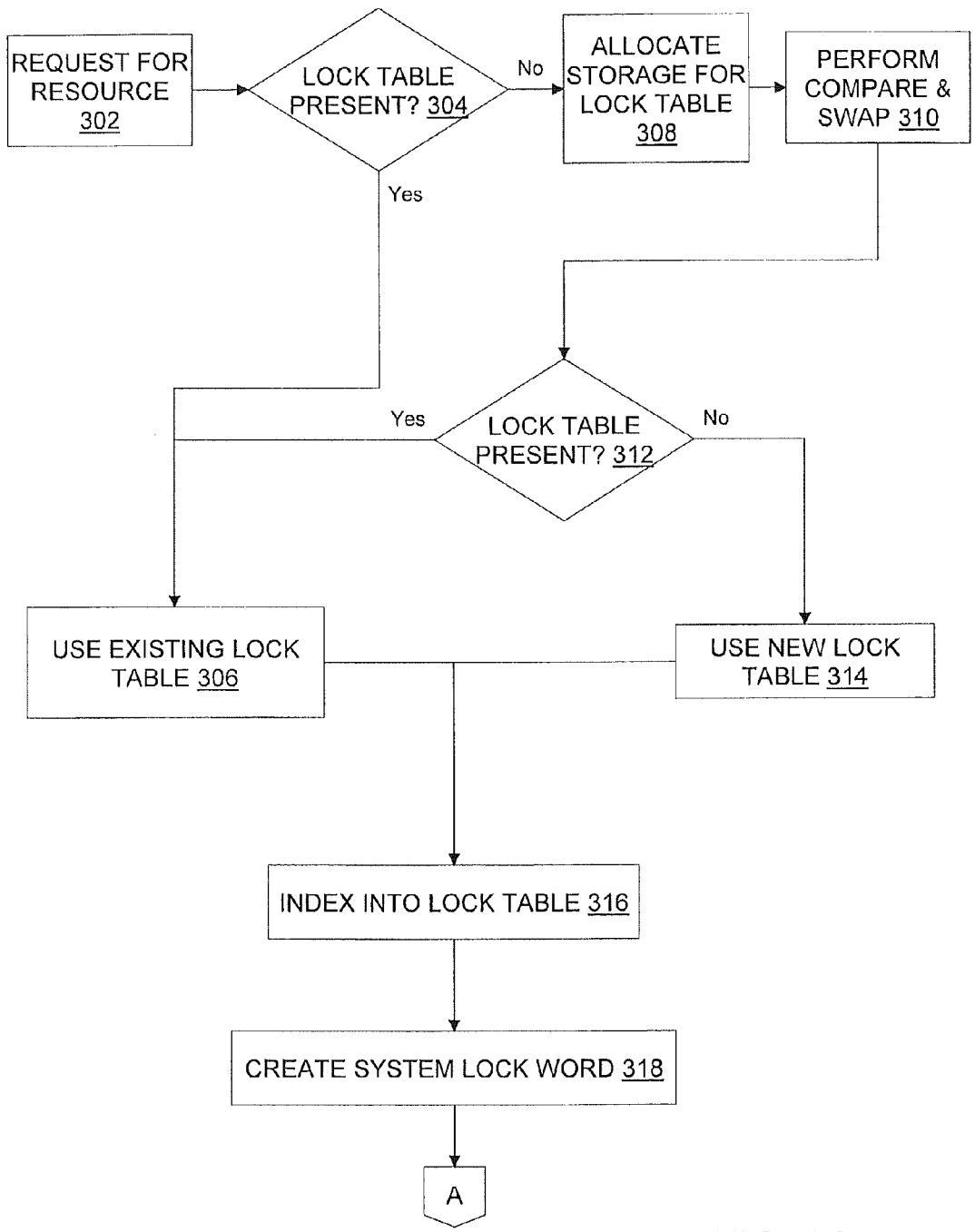
FIGS. 3A-3B are flow diagrams illustrating a process for implementing recursive thread locking in an exemplary embodiment.
Figure 3B:
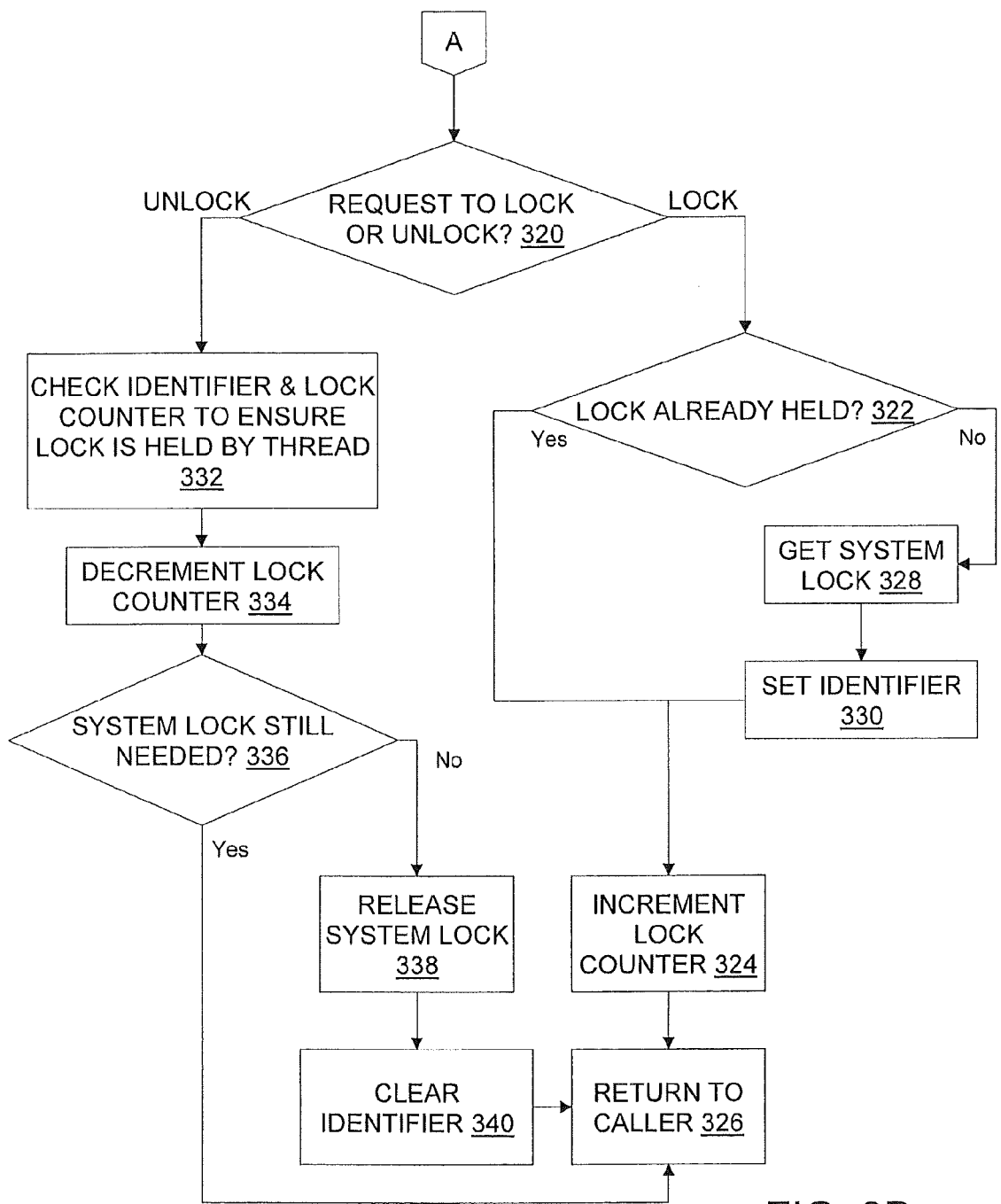

Turning now to FIGS. 3A-3B, a flow diagram illustrating an exemplary embodiment of a process for implementing recursive thread locking operations will now be described. For purposes of illustration, it is assumed that the address of the lock table, once initialized, is stored in a static variable common to all threads in a process, and the variable is initialized to a NULL value. The lock table address may be stored, e.g., in a transaction memory component of a processor (e.g., processor 104) in the system 100 of FIG. 1. The processes of FIGS. 3A-3B are described with respect to the lock table 200 in FIG. 2 for illustrative purposes.

At step 302, a shared object (resource) is requested by a calling process thread. At step 304, the system logic determines whether a lock table for the calling process thread is present in the system. For example, upon invoking a lock by a thread, the value of the static variable may be checked for a NULL value. If the value is NULL, this means that the lock table has not been initialized (i.e., the lock table is not present).

At step 308, the system logic allocates storage for the lock table. For example, to initialize the table, adequate storage that is common for all threads in the process is obtained. The amount of storage needed may be determined as the maximum number of threads for a process multiplied by the size of the lock structure (e.g., the size of the identifier 204 and the size of the lock counter). Once the storage is allocated for the lock table, an atomic compare-and-swap operation is performed on the local static variable used to store the address of the lock table at step 310. A compare-and-swap operation refers to an atomic operation that updates a value in memory if and only if the current value is equal to a value supplied by the caller of the operation. In step 310, e.g., the compare-and-swap operation is called in response to a first attempt to create a lock table. As indicated above, it is assumed that the address for the lock table is initially set to NULL. Upon allocating storage for the lock table (step 308), the compare-and-swap operation is called in order to save the address of the newly allocated lock table.

It is again determined if the lock table is present at step 312 (e.g., the value of the local variable is not NULL). If the value of the local variable is still NULL at step 312, then a new lock table is used (e.g., the local variable is updated with the address of the storage which was obtained by the calling thread (step 302)) at step 314. However, if the value is no longer NULL at step 312, or alternatively, if the lock table is present (step 304), then this means another thread in the process has already initialized the lock table (perhaps while the current thread was attempting to do the same). In this case, the storage obtained by the calling thread is released and the calling thread continues processing using the lock table initialized by the other thread at step 306. This process prevents collisions during the creation of the lock table. It is also worth noting that the lock table itself is never locked. With the exception of the time of creation and/or expansion of the lock table, separate threads will not operate on the same portion of the lock table. A thread will only update entries in its own slot. Whenever a global field in the lock table needs to be updated, the compare-and-swap operation is implemented. The first thread wins and the current thread uses the wining thread's update, which prevents serialized access to the lock table so that multiple threads are not bottlenecked if they perform operations on different shared objects.

As indicated above, the existing lock table is described with respect to FIG. 2 for purposes of illustration.

Once the calling thread (one of the threads in field 202) has the address of the lock table 200, it indexes into the lock table 200 at step 316, and creates a lock word for the shared object at step 318 (e.g., by using the address of the shared object as the object identifier).

It will be understood that a system wide locking mechanism may be employed by the system 100 of FIG. 1 (that is, a locking mechanism that is not subject to the exclusive use of the process, but rather is employed by other processes implemented via the system 100). The system wide locking mechanism may be stored in any public storage location in system 100. Since a lock word may also be used by a system wide locking mechanism, it is important that the lock word uniquely identifies the shared object across all processes. Since the virtual address space for multiple processes may be the same, the address of the shared object may not uniquely identify it. The following scheme may be used to create the lock word:

Byte [0]="l" which marks the lock word as a system controlled resource;

Bytes [1-3]=The upper three bytes of the system virtual address (SVA) for the process' master thread. A master thread refers to the main thread in a process. All processes start off non-threaded. Once a thread is created, what was originally the process becomes the master thread. The process then consists of two threads, the new one and "first" or "original thread." The SVA of the master thread is used because it is unique within the system and known to all the threads within a process. Using only the upper three bytes of the SVA is unique since the SVA is a four byte pointer on a 4 KB boundary;

Bytes [4-7]=The 31-bit storage address of the shared object.

This scheme provides benefits in that the threads which access the shared object do not need to store the lock word itself since it may be dynamically recreated by any thread in the process. Other benefits include the ability to distinguish system controlled resources from user-defined resources, as well minimize storage requirements, as only eight bytes of storage is needed to uniquely identify the shared object across the entire system.

The system logic indexes into the lock table 200 (step 316) based on the thread's identifier (field 202) within the process. The thread's identifier may be assigned to the thread when it is created, e.g., by a POSIX function pthread_create( ) or other similar means. Once the system logic indexes into the lock table 200, it may reference the corresponding lock structure 210 for the calling thread. Based on the requested action, e.g., lock or unlock, the following actions are performed in an exemplary embodiment.

If the request from the calling thread is to lock a shared object at step 320, it I determined whether the value in the identifier field 204 matches the shared object address at step 322. If so, this indicates the calling thread already owns the lock for the shared object. The lock does not need to be requested. The lock counter in the corresponding lock structure is incremented via the lock counter field 206 at step 324, and process control returns back to the calling thread at step 326. Thus, in this instance, a system call (e.g., a call to the system wide locking mechanism) to query the lock is avoided. Also, the calling thread will not block itself by requesting a lock it already holds.

If, however, the value in the identifier field 204 does not match the shared object identifier at step 322, this indicates the calling thread does not own the lock for the shared object. The system logic then calls the system wide locking mechanism to lock the system wide unique lock word at step 328. The system locking mechanism queues the calling thread as a waiter for the lock. Once the lock becomes available it is granted to the waiting thread. The system logic then sets the identifier field 204 to reflect the lock at step 330 and increments the lock counter via the lock counter field 206 at step 324 in the corresponding lock structure of the calling thread and returns the process to the calling thread at step 326.

If the request is to unlock a shared object at step 320, the system logic ensures that the identifier (in field 204) in the corresponding lock structure of the calling thread matches the address of the shared object at step 332. If the values do not match, this means the calling thread does not hold the lock for the shared object. If the identifier in field 204 does match the address of the shared object, then the value of the lock counter in field 206 for the corresponding lock structure is decremented at step 334 and then compared to zero at step 336. If the lock counter is still greater than zero at step 336, then a recursive lock has been released. This means the system wide lock still needs to be held by the calling thread. The system logic returns the process to the calling thread at step 326 while retaining the lock on the shared object. If the lock counter value is equal to zero after it was decremented at step 336, then all (if any) recursive locks have been released. This means that the calling thread no longer requires the system wide lock on the shared object. The system logic calls the system locking mechanism to release the lock on the system wide unique lock word at step 338. The protocol then clears the identifier in field 204 in the lock structure for the calling thread at step 340 and the process returns to the calling thread at step 326.

Figure 4:
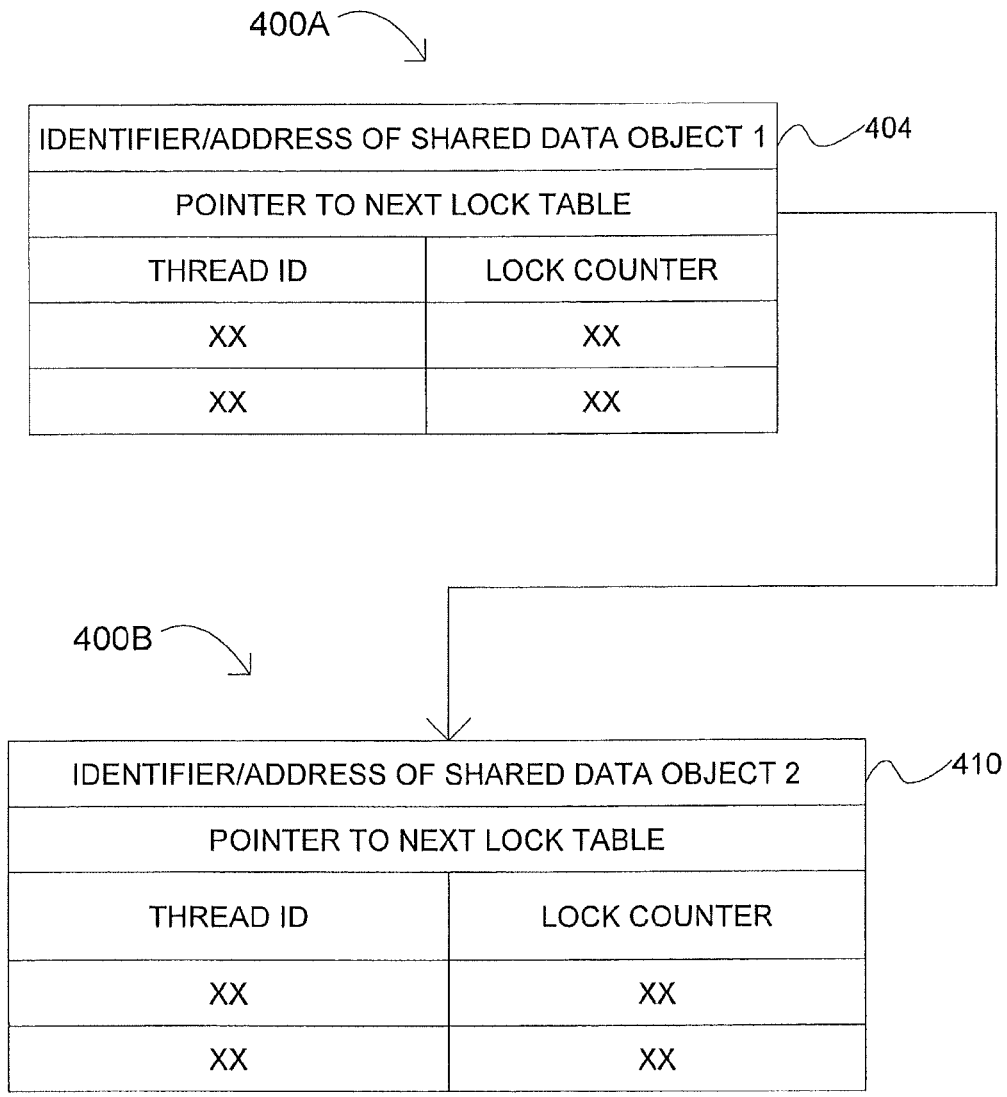
FIG. 4 is a table including a locking structure used in implementing recursive thread locking operations in an alternative exemplary embodiment.

The exemplary embodiments may be expanded to allow a thread to hold multiple locks for multiple shared objects. This may be implemented using various techniques. One technique includes providing a separate lock table for each shared object. This embodiment is shown in FIG. 4. As shown in FIG. 4, lock tables 400A and 400B are chained off of one another. Each table 400A/400B has an identifier 404 and 410, respectively, that associates it with the shared object. This identifier 404/410 is stored as an eye-catcher in the lock table 400A and 400B, respectively, for the shared object. In an exemplary embodiment, the eye-catcher field serves as the shared object identifier. For table 200, the eye-catcher is used as a way to easily "see/find/identify" the lock table when looking for it in memory. The eye-catcher field may also be used to validate and invalidate the lock table. That is, once the lock table is initialized the eye-catcher is set to a specific value. Threads may check this value to determine the validity of the lock table. Once the lock table is no longer valid/not used, the eye-catcher may be cleared from the lock table or set to an "invalid" value. Another use of the eye-catcher filed may be to manage different versions of the lock table. For example, if a lock table is already allocated using a predefined lock structure of a set size and a new lock table is created using a lock structure of a different size (perhaps a lock structure with additional new fields), the eye-catcher may be used to indicate which version the lock table represents.

When the locking protocol is called to perform an action, the system logic checks the eye-catcher (e.g., the object identifier in field 404) in the first lock table 400A. If the eye-catcher does not match the address or identifier of the shared object, the system logic checks at the next lock table 400B. This continues until the correct lock table is found or the end of the chain is reached. If the lock table does not exist, one is created and added to the chain. When this method is used, a shared object identifier does not need to be stored in each of the lock structures since the table is uniquely associated with a specific shared object (e.g., via fields 404/410). Therefore, instead of the lock table being an array of lock structures, it is an array of lock counters. The system logic behaves in a similar manner as described above. The system wide unique lock word is generated and used by the system locking mechanism. A lock counter value of zero indicates that the thread does not hold the lock for the shared object. A lock counter value greater than zero indicates that it does.

Figure 5A:
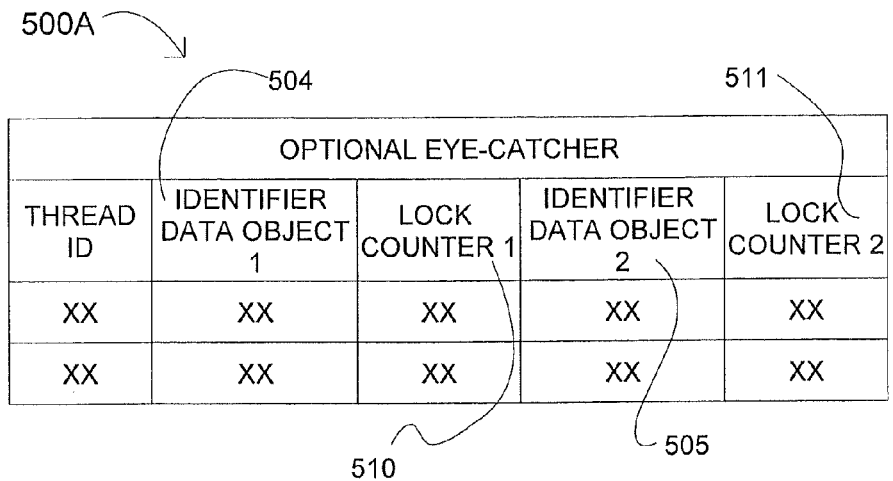
FIG. 5A is a table including a locking structure used in implementing recursive thread locking operations in a further alternative exemplary embodiment.
Figure 5B:
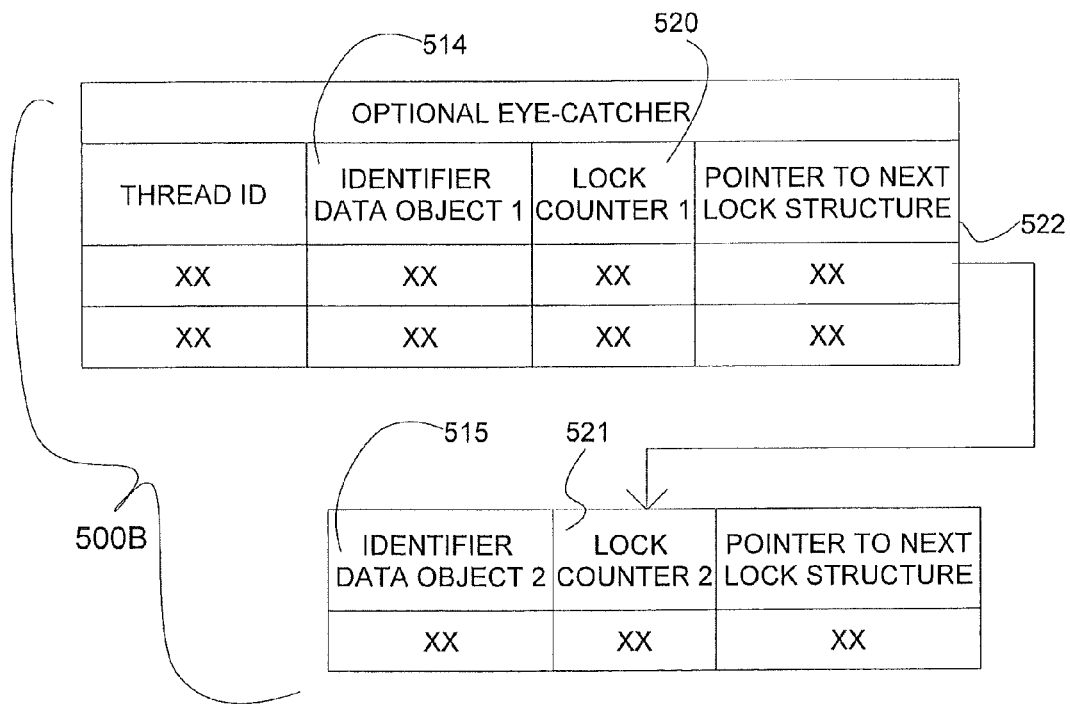
FIG. 5B is a table including a locking structure used in implementing recursive thread locking operations in yet a further alternative exemplary embodiment.

Another technique includes retaining a single lock table but expanding the lock structures. Exemplary embodiments of this technique are shown in FIGS. 5A and 5B. As shown in FIG. 5A, lock structure 500A is expanded to contain multiple identifiers (e.g., shared object identifier fields 504 and 505) and lock counters (e.g., lock counters 510 and 511) in order to allow a thread to lock a set number of shared objects. This lock restriction may be useful to prevent threads from holding too many system resources at one time. If such a restriction is not needed, lock structures may be chained together in a non-bounded manner as shown in FIG. 5B. As shown in FIG. 5B, lock structures 500B include two tables 500B where a pointer 522 is directed from one table to the other. The lock structures 500B are expanded to contain multiple identifiers (e.g., shared object identifier 514 and 515) and lock counters (e.g., lock counters 520 and 521). The system logic may operate or function in a similar manner as described above. Based on the action requested, the identifier (e.g., field 514) is matched to a shared object, the system wide locking mechanism is called as needed, and the corresponding lock counter (e.g., counter 520) is adjusted accordingly.

Technical effects include the capability to provide synchronized locking operations in a multi-threaded computer system environment. Synchronized locking operations are enabled via a configured locking structure that manages recursion and provides separation of a lock word from a shared resource that is subject to a lock. The locking structure also provides the ability for a thread to release the storage for a shared object without negatively impacting other threads that attempt to lock the same shared object. Additionally, the locking structure provides the ability for a single thread to gain and release the lock word for a shared object multiple times. The locking structure further enables separate processes to lock different objects that happen to map to the same virtual address within its respective process' storage area.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
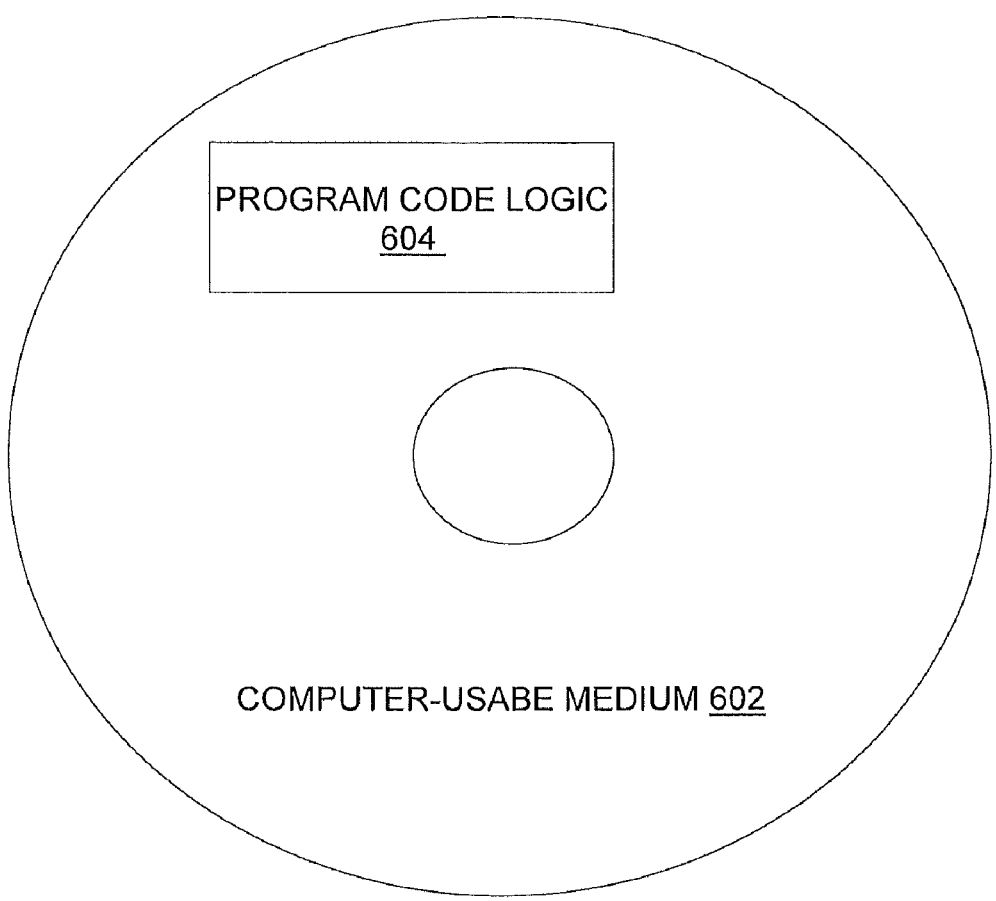
FIG. 6 is a computer program product that may be implemented by an exemplary embodiment.

As described above, embodiments can be embodied in the form of computer-implemented processes and apparatuses for practicing those processes. In exemplary embodiments, the invention is embodied in computer program code executed by one or more network elements. Embodiments include a computer program product 600 as depicted in FIG. 6 on a computer usable medium 602 with computer program code logic 604 containing instructions embodied in tangible media as an article of manufacture. Exemplary articles of manufacture for computer usable medium 602 may include floppy diskettes, CD-ROMs, hard drives, universal serial bus (USB) flash drives, or any other computer-readable storage medium, wherein, when the computer program code logic 604 is loaded into and executed by a computer, the computer becomes an apparatus for practicing the invention. Embodiments include computer program code logic 604, for example, whether stored in a storage medium, loaded into and/or executed by a computer, or transmitted over some transmission medium, such as over electrical wiring or cabling, through fiber optics, or via electromagnetic radiation, wherein, when the computer program code logic 604 is loaded into and executed by a computer, the computer becomes an apparatus for practicing the invention. When implemented on a general-purpose microprocessor, the computer program code logic 604 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for implementing process thread locking operations in a concurrent programming environment, the method comprising:
   defining a lock structure comprising data fields, the data fields including:
      a process thread identifier that uniquely identifies each thread that is common to a process; and
      a shared object identifier that uniquely identifies a shared object subject to lock operations by each thread in the process;
   using the lock structure to build a lock table for internal use by the process, the lock table including lock structures for each process thread in the process, the lock table searchable by the process thread identifier in response to a request for a shared object from a calling thread in the process;
   determining a lock status of the shared object in the lock table via a corresponding process thread identifier of the calling process thread, an address of the requested shared object, and the shared object identifier, wherein the lock status indicates whether the shared object is currently locked by the calling process thread;
   in response to the lock status, performing one of: obtaining a lock on the shared object when the request is for a lock, and releasing a lock on the shared object when the request is to unlock the shared object;
   in response to the request for the shared object, dynamically creating a lock word by setting a value in a portion of the lock word, the value in the lock word specifying the lock word as a system controlled resource; and
   storing the lock word in the lock table, the lock word stored separately from the shared object;
   wherein the lock word represents the shared object identifier and differentiates the lock word from a system controlled lock word.

2. The method of claim 1, further comprising:
   entering a system virtual address for the calling thread in a second portion of the lock word; and
   entering the address of the requested shared object in a third portion of the lock word;
   storing the lock word in the lock table, the lock word stored separately from the shared object;
   wherein the lock word represents the shared object identifier and differentiates the lock word from a system controlled lock word.

3. The method of claim 2, wherein the lock structure further comprises a lock counter that tracks a lock value of the shared object with respect to a corresponding process thread in the process, the lock counter incremented and decremented in response to instances of respective lock and unlock operations with respect to the shared object;
   wherein determining the lock status further includes determining the lock value, the method further comprising:
   upon determining the request is to lock the shared object and that the shared object identifier matches the address of the requested shared object, incrementing the lock value in the lock counter, the match reflecting the calling thread currently holds a lock on the shared object; and
   maintaining the lock on the shared object for the calling thread.

4. The method of claim 3, wherein upon determining the request is to lock the shared object and that the shared object identifier does not match the address of the requested shared object, calling to a system lock table for a lock on the shared object;
   wherein upon receiving the lock from the system lock table, the method includes:
   incrementing the lock value in the lock counter; and
   entering the shared object identifier in the shared object identifier field to reflect the lock.

5. The method of claim 2, wherein the lock structure further comprises a lock counter that tracks a lock value of the shared object with respect to a corresponding process thread in the process, the lock counter incremented and decremented in response to instances of respective lock and unlock operations with respect to the shared object;
   wherein determining the lock status further includes determining the lock value, the method further comprising:
   upon determining the request is to unlock the shared object and that the shared object identifier matches the address of the requested shared object, decrementing the lock value in the lock counter.

6. The method of claim 5, further comprising:
   in response to decrementing the lock value, comparing the decremented lock value to zero;
   if the decremented lock value is greater than zero, maintaining the lock on the shared object for the calling thread, the decremented lock value greater than zero reflecting a release of a recursive lock; and if the decremented lock value is equal to zero, releasing the lock on the shared object for the calling thread.

7. The method of claim 1, wherein in response to the request for the shared object, the method includes:
initializing a value of a static variable to null, the static variable common to all threads in the process and configured to store an address of the lock table;
checking the value of the static variable;
if the value of the static variable is null:
allocating storage for the lock table;
performing a second check on the value of the static variable;
if the value of the static variable is null in response to the second check, updating the value of the static variable to an address of the allocated storage;
if the value of the static variable contains an address for the lock table in response to the second check, releasing the allocated storage and accessing the lock table using the address in the static variable;
if the value of the static variable contains an address for the lock table, accessing the lock table using the address in the static variable.

8. A system for implementing process thread locking operations in a concurrent programming environment, the method comprising:
a computer processor; and
system logic executing on the computer processor, the system logic implementing a method, comprising:
defining a lock structure comprising data fields, the data fields including:
a process thread identifier that uniquely identifies each thread that is common to a process; and
a shared object identifier that uniquely identifies a shared object subject to lock operations by each thread in the process;
using the lock structure to build a lock table for internal use by the process, the lock table including lock structures for each process thread in the process, the lock table searchable by the process thread identifier in response to a request for a shared object from a calling thread in the process;
determining a lock status of the shared object in the lock table via a corresponding process thread identifier of the calling process thread, an address of the requested shared object, and the shared object identifier, wherein the lock status indicates whether the shared object is currently locked by the calling process thread;
in response to the lock status, performing one of: obtaining a lock on the shared object when the request is for a lock, and releasing a lock on the shared object when the request is to unlock the shared object;
in response to the request for the shared object, dynamically creating a lock word by setting a value in a portion of the lock word, the value in the lock word specifying the lock word as a system controlled resource; and
storing the lock word in the lock table, the lock word stored separately from the shared object;
wherein the lock word represents the shared object identifier and differentiates the lock word from a system controlled lock word.

9. The system of claim 8, wherein the system logic further performs:
entering a system virtual address for the calling thread in a second portion of the lock word; and
entering the address of the requested shared object in a third portion of the lock word.

10. The system of claim 9, wherein the lock structure further comprises a lock counter that tracks a lock value of the shared object with respect to a corresponding process thread in the process, the lock counter incremented and decremented in response to instances of respective lock and unlock operations with respect to the shared object;
wherein determining the lock status further includes determining the lock value, the method further comprising:
upon determining the request is to lock the shared object and that the shared object identifier matches the address of the requested shared object, incrementing the lock value in the lock counter, the match reflecting the calling thread currently holds a lock on the shared object; and
maintaining the lock on the shared object for the calling thread.

11. The system of claim 10, wherein upon determining the request is to lock the shared object and that the shared object identifier does not match the address of the requested shared object, calling to a system lock table for a lock on the shared object;
wherein upon receiving the lock from the system lock table, the method includes:
incrementing the lock value in the lock counter; and
entering the shared object identifier in the shared object identifier field to reflect the lock.

12. The system of claim 9, wherein the lock structure further comprises a lock counter that tracks a lock value of the shared object with respect to a corresponding process thread in the process, the lock counter incremented and decremented in response to instances of respective lock and unlock operations with respect to the shared object;
wherein determining the lock status further includes determining the lock value, the method further comprising:
upon determining the request is to unlock the shared object and that the shared object identifier matches the address of the requested shared object, decrementing the lock value in the lock counter.

13. The system of claim 12, wherein the system logic further performs:
in response to decrementing the lock value, comparing the decremented lock value to zero;
if the decremented lock value is greater than zero, maintaining the lock on the shared object for the calling thread, the decremented lock value greater than zero reflecting a release of a recursive lock; and
if the decremented lock value is equal to zero, releasing the lock on the shared object for the calling thread.

14. The system of claim 8, wherein in response to the request for the shared object, the system logic further performs:
initializing a value of a static variable to null, the static variable common to all threads in the process and configured to store an address of the lock table;
checking the value of the static variable;
if the value of the static variable is null:
allocating storage for the lock table;
performing a second check on the value of the static variable;
if the value of the static variable is null in response to the second check, updating the value of the static variable to an address of the allocated storage;
if the value of the static variable contains an address for the lock table in response to the second check, releasing the allocated storage and accessing the lock table using the address in the static variable;

if the value of the static variable contains an address for the lock table, accessing the lock table using the address in the static variable.

15. A computer program product for implementing process thread locking operations in a concurrent programming environment, the computer program product including a non-transitory storage medium encoded with machine-readable program code, which when executed by a computer processor implement a method, the method comprising:
  defining a lock structure comprising data fields, the data fields including:
    a process thread identifier that uniquely identifies each thread that is common to a process; and
    a shared object identifier that uniquely identifies a shared object subject to lock operations by each thread in the process;
  using the lock structure to build a lock table for internal use by the process, the lock table including lock structures for each process thread in the process, the lock table searchable by the process thread identifier in response to a request for a shared object from a calling thread in the process;
  determining a lock status of the shared object in the lock table via a corresponding process thread identifier of the calling process thread, an address of the requested shared object, and the shared object identifier, wherein the lock status indicates whether the shared object is currently locked by the calling process thread;
  in response to the lock status, performing one of: obtaining a lock on the shared object when the request is for a lock, and releasing a lock on the shared object when the request is to unlock the shared object;
  in response to the request for the shared object, dynamically creating a lock word by setting a value in a portion of the lock word, the value in the lock word specifying the lock word as a system controlled resource; and
  storing the lock word in the lock table, the lock word stored separately from the shared object;
  wherein the lock word represents the shared object identifier and differentiates the lock word from a system controlled lock word.

16. The computer program product of claim 15, wherein the method further comprises:
  entering a system virtual address for the calling thread in a second portion of the lock word; and
  entering the address of the requested shared object in a third portion of the lock word.

17. The computer program product of claim 16, wherein the lock structure further comprises a lock counter that tracks a lock value of the shared object with respect to a corresponding process thread in the process, the lock counter incremented and decremented in response to instances of respective lock and unlock operations with respect to the shared object;
  wherein determining the lock status further includes determining the lock value, the method further comprising:
    upon determining the request is to lock the shared object and that the shared object identifier matches the address of the requested shared object, incrementing the lock value in the lock counter, the match reflecting the calling thread currently holds a lock on the shared object; and
    maintaining the lock on the shared object for the calling thread.

18. The computer program product of claim 17, wherein upon determining the request is to lock the shared object and that the shared object identifier does not match the address of the requested shared object, calling to a system lock table for a lock on the shared object;
  wherein upon receiving the lock from the system lock table, the method includes:
    incrementing the lock value in the lock counter; and
    entering the shared object identifier in the shared object identifier field to reflect the lock.

19. The computer program product of claim 16, wherein the lock structure further comprises a lock counter that tracks a lock value of the shared object with respect to a corresponding process thread in the process, the lock counter incremented and decremented in response to instances of respective lock and unlock operations with respect to the shared object;
  wherein determining the lock status further includes determining the lock value, the method further comprising:
    upon determining the request is to unlock the shared object and that the shared object identifier matches the address of the requested shared object, decrementing the lock value in the lock counter.

20. The computer program product of claim 19, wherein the method further comprises:
  in response to decrementing the lock value, comparing the decremented lock value to zero;
  if the decremented lock value is greater than zero, maintaining the lock on the shared object for the calling thread, the decremented lock value greater than zero reflecting a release of a recursive lock; and
  if the decremented lock value is equal to zero, releasing the lock on the shared object for the calling thread.

* * * * *